Figure 1:
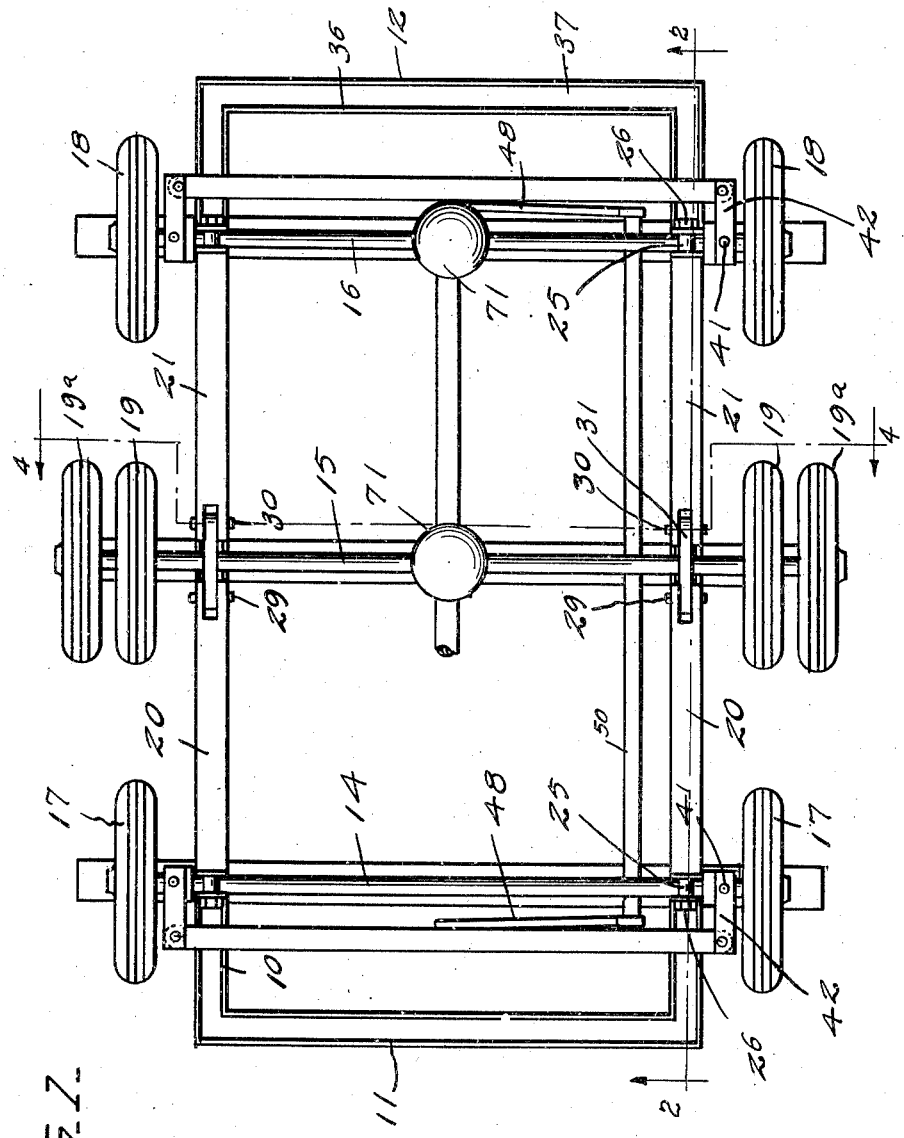

Dec. 20, 1949 L. A. McFARLANE 2,491,994
SPRING SUSPENSION FOR TANDEM WHEELED VEHICLES
Filed March 11, 1946 3 Sheets-Sheet 1

Inventor
L. A. McFARLANE
By Kimmel & Crowell
Attorneys

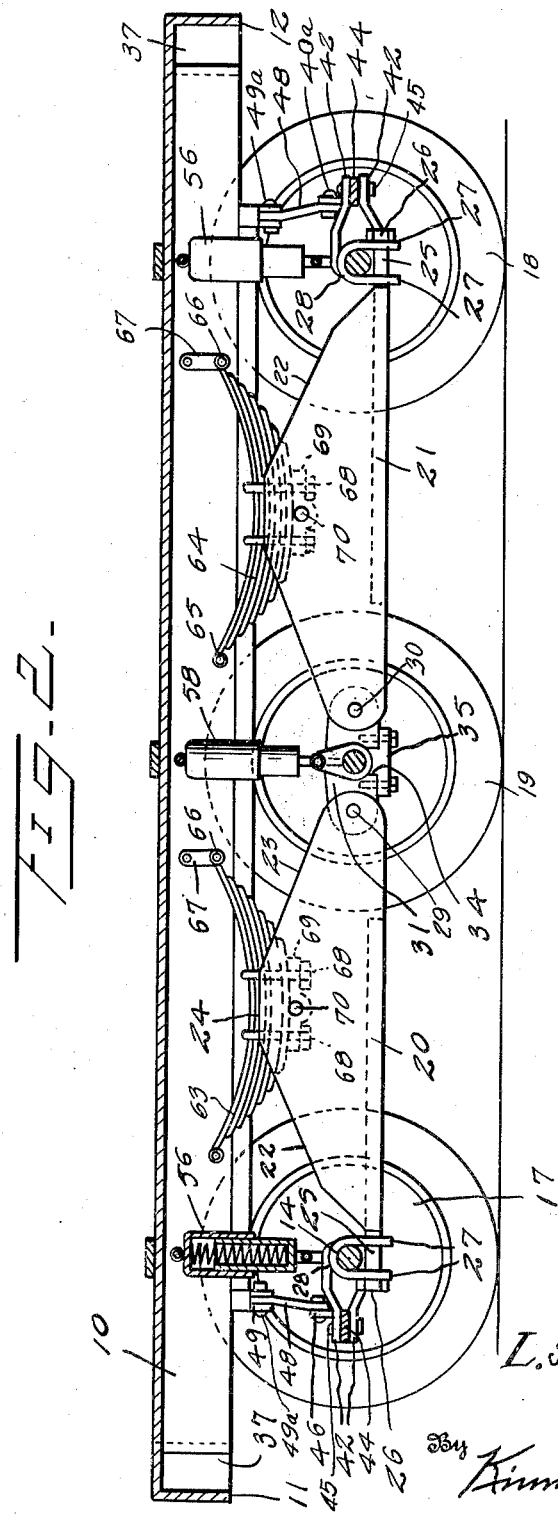

Dec. 20, 1949  L. A. McFARLANE  2,491,994
SPRING SUSPENSION FOR TANDEM WHEELED VEHICLES
Filed March 11, 1946  3 Sheets-Sheet 3
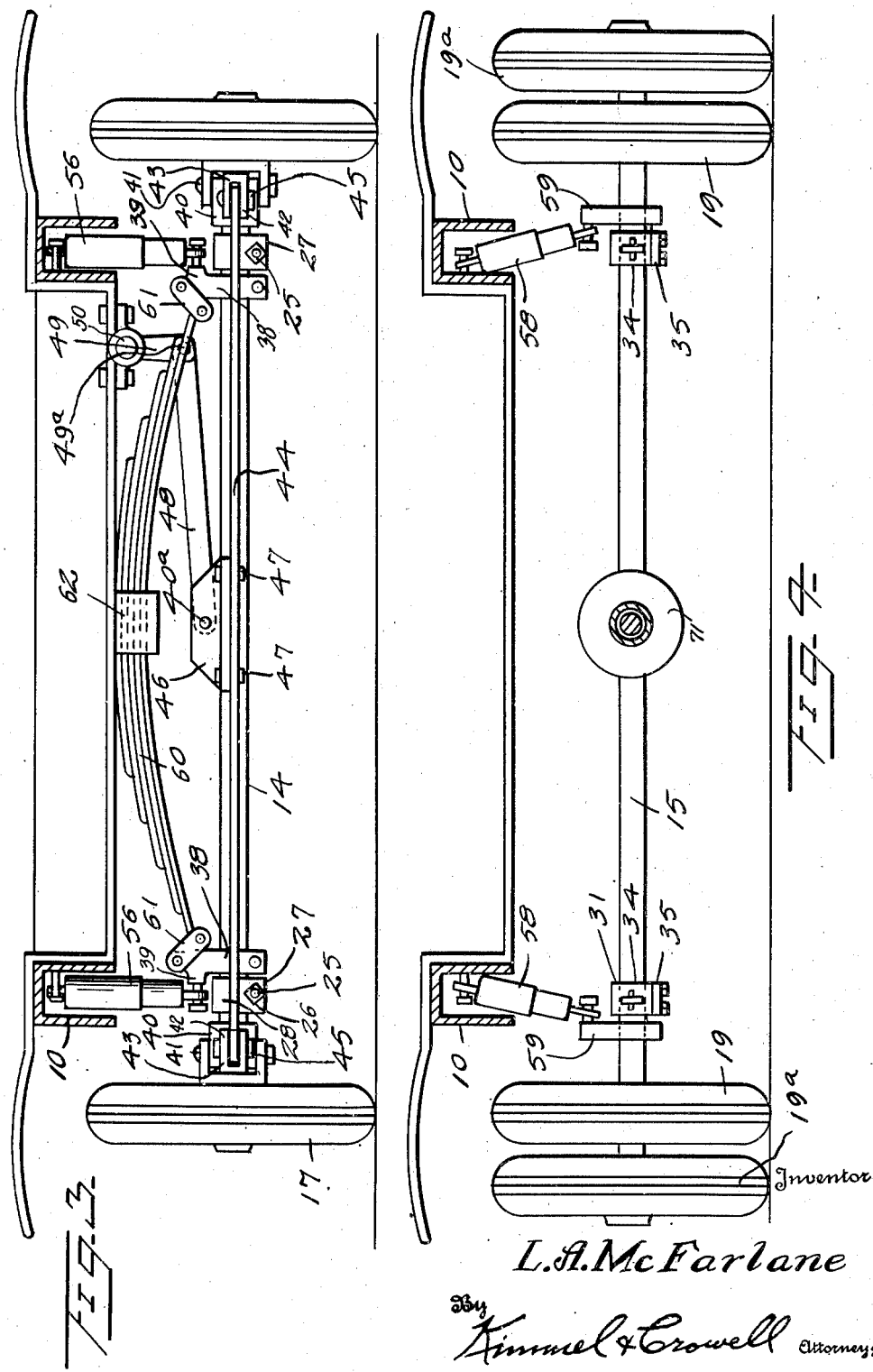

Patented Dec. 20, 1949

2,491,994

UNITED STATES PATENT OFFICE 2,491,994

SPRING SUSPENSION FOR TANDEM WHEELED VEHICLES

Lloyd A. McFarlane, Salem, Oreg.

Application March 11, 1946, Serial No. 653,534

2 Claims. (Cl. 280—104.5)

This invention relates to improvements in transportation instrumentalities and more particularly to vehicle chassis.

One of the objects thereof is to provide a simple, highly efficient and sturdy device of this character designed along lines of powerful strain and stress resisting performability on the road, irrespectively of the loads imposed thereupon.

Another object thereof is to construct, shape and arrange the parts of the novel vehicle chassis that they will readily lend themselves to counteracting severe jolts, jerks and strains no matter upon which part or end of the chassis same may be impressed or encountered as the vehicle is being hauled along a roadway.

Another object thereof is to provide a special vehicle chassis designed especially to withstand and counteract rough usage such as sustaining sudden or uneven loads or being subject to sudden violent stresses and strains, and in doing so diverting the jars and jolts from the vehicle body to resiliently acting sub-structures.

A still further object thereof is to provide, in a device of the kind described, a combination of shock-absorbing members distributed conveniently along the length of the chassis, floating connections between separate sets of wheels, and steering mechanism operable in conjunction with the end sets of wheels.

A further object thereof is to provide a vehicle chassis with three sets of wheels distributed longitudinally of the body thereof, with suitable expedients for assuring that the riding qualities of the vehicle into which these parts are built will be easy and equalized due to the location at proper points of shock-absorbing elements between the wheels and the body and the juxtaposition between the wheels along the sides of the body of equalizing floating supports for the axles of the wheels.

In carrying out the foregoing objects it is contemplated that a vehicle constructed in accordance with principles detailed herein will be able to negotiate steep grades, uneven surfaces in the roadway without losing balance or causing dangerous situations to the driver; and that said vehicle will further be able to right itself when encountering impediments in the roadway.

With the above and other objects in view my invention consists in the combination, arrangement and details of construction disclosed in the drawings and specification and then more particularly pointed out in the appended claims.

In the drawings, wherein similar reference characters designate similar parts throughout the separate views, Figure 1 is a bottom plan view of my invention, certain parts being omitted, Figure 2 is a side elevation thereof, partly in section taken on the line 2—2 of Figure 1 and looking in the direction of the arrows, Figure 3 is a front end elevation thereof, partly in section, and Figure 4 is a transverse sectional view taken on the line 4—4 of Figure 1.

In the drawings which are merely illustrative of my invention I disclose a suitable vehicle chassis, the body of which is designated 10 and the ends 11 and 12, being preferably formed rectangular with a perimetral flange and an inner flange 36 flanking the outer flange to provide a channel 37. Such a body construction gives strength and sturdiness in the assumption of variable loads. I provide a pair of wheels 17 and 18 at the opposite ends of the frame or body 10, and I provide a central pair of dual wheels, 19, 19a, suitable stout, heavy-duty tires being provided upon the wheels respectively.

The axles for the respective pairs of wheels are designated 14, 15 and 16. One of the important features of my invention is provision of the pairs of longitudinally spaced apart supporting beams or arms 20 and 21 which are triangular in formation so that their upper ends are narrowest and their base portions the longest. They are shown thus with oppositely and downwardly inclining edges 22 and 23 respectively, their narrow upper portions providing seats 24 which support securely the lower ends of bow springs 63, 64 respectively, upon shackles 68 which girdle said springs and are supported upon cleats 69, which in turn are fastened by pins 70 to the supporting arms or beams 20 and 21.

It will be seen that stout horse-shoe shaped axle cleats or members 28 have hanging parallel legs 27 straddling the terminals 25 which project beyond the connecting or supporting arms 20, 21 which terminals pass through the cleats, and are held against displacement therefrom by means of the nuts 26 threaded thereon and clamped home against the cleats. The opposite ends of the supporting beams 20, 21, where they confront in spaced apart relation are designed to be swivelly connected upon rocker arms 31 which are centrally recessed out at 34 for the snug reception thereinto of the opposing ends of the axle 15 for the central dual wheels, a suitable cap 35 being operatively lodged in said recessed portion of the rocker arms, and held against displacement therein. Pins 29 and 30 are the means which pivotally attach the ends of the supporting beams upon the ends of the rocker arms 31 by which both sets of arms are arranged in longitudinal alignment.

Cross-spring standards 38 are set beside the cleats 27 and formed as a lateral offset upon these standards are arms 39 upon which the lower ends of contractile springs or shocks 56 are attached whose upper ends are suitably secured in upright relation to the body 10. The end axles 14 and 16 carry forks 40, and upright stout pins 41 therein serve to hold, in swivelled relation to these axles, cranks 43, and a connecting bar or rod 44 extends transversely of the body 10, so as to be pivoted to these cranks 43 by pins 45. A bracket member 46 is secured by fasteners 47 to the connecting bar 44. The ends of the connecting or tie rod 44 are pivotally connected between the straddling arms 42 which are themselves fixedly attached to the parts 43. A link arm 48 is pivoted at its inner end by pin 40a to bracket 46, and is pivotally attached at its other end by pivots 49a to steering lever 49 which is pivotally and suspendingly mounted from pin 50 operatively secured onto the body 10.

It will be seen that the free ends of the bow or leaf springs 63, 64 are attached at 65 and 66 respectively, with respect to the body 10, the points of attachment 66 being on hangers 67 secured directly to said body. Adapted to extend transversely of the body 10 adjacent each end thereof is an elongated bow or leaf spring 60. One of them is shown in Figure 3, secured centrally by a cleat 62 of approved construction directly to the body 10, while the free ends thereof are mounted in sustaining floating hangers 61, pivotally carried by the cross spring standards 38. Motors, not shown in the drawings, are connected to the differentials 71 shown in connection with several of the axles.

From the construction and arrangement of the various parts, especially from the floating connections established and maintained between the longitudinally spaced apart wheels on each side of the vehicle chassis, the vehicle is able to take up severe thrusts and jolts no matter from which direction delivered. Should the body 10 be subjected to heavy loads same are counteracted efficiently by retraction of the sets of contractile springs or telescopic shocks, Figures 3 and 4, 56, 58, bow springs 63, 64, and bow spring or springs 60, as the case may be; these sets of springs are distributed at equal spaces apart throughout the length and breadth of the vehicle chassis for the purpose of equalizing the draft upon the rolling parts, and rendering in equilibrium effectively at all times the oppositely arranged supporting beams 20 and 21 which will suffer some punishment no matter at which points severe jars and jolts are imparted to the chassis.

The retractile springs serve as shock absorbers for cushioning strains and stresses and violent lurchings impressed upon the body with respect to the wheels, or upon the wheels with respect to the supporting members 20 and 21. By making these supporting arms 20 and 21, arranged between central dual wheels and end wheels floating upon springs and rocker pivots it will readily be seen how it is able to withstand severe irregularities in strains and jerks, as the wheels encounter impediments in the roadway or are ascending steep grades, especially with unusually heavy loads in the body 10. Either supporting beam 20 or 21 can float upon resilient bearings and give easily when subjected to severe jolts, and the action of the rolling wheels for body stabilization purposes is promoted directly by the circumstance that the wheels are rendered self-righting even with loads unequally distributed upon the body by reason of the fact that their outer ends hang or are strung resilient upon the swiveling ends of the end wheel axles, while their inner ends are rockingly supported upon the rocker arms 31, so that severe stresses falling upon the ends of the body are transmitted inevitably by means of one supporting beam 20 or both of these beams 20 and 21 and concentrated upon the rocker arms 31 which take up the stresses without injury to the body because a rocking movement is the consequence.

I do not mean to confine myself to the exact details of construction disclosed herein but intend to cover all variations falling within the purview of the appended claims.

What I desire to claim is:

1. A vehicle chassis comprising a frame, a transverse axle at each end of said frame, transverse springs carried by said frame and engaging the ends of said axles, a center transverse axle midway between said first axles, a rocker arm rockable on each of the ends of said center axle and extending on opposite sides thereof, longitudinal supporting beams fixed at one end thereof to the ends of said first axles, means pivotally connecting the other ends of said beams to the adjacent extension of the related said rocker arm, longitudinally extending springs between said beams and said frame and a shock absorber connected between said frame and each of said axles at the ends thereof.

2. A vehicle chassis comprising a frame, a transverse axle at each end of said frame, transverse springs carried by said frame and engaging the ends of said axles, a center transverse axle midway between said first axles, a rocker arm rockably carried intermediate the length thereof on each end of said center axle, a longitudinal supporting beam having one end thereof fixedly carried by each end of said first named axles, the other end of each of said beams extending towards said center axle, means pivotally connecting said other end of each of said beams to the adjacent end of the related rocker arm, longitudinally extending springs between said beams and said frame, and a shock absorber connected between said frame and each of said axles at the ends thereof.

LLOYD A. McFARLANE.

REFERENCES CITED

The following references are of record in the file of this patent:

UNITED STATES PATENTS

| Number | Name | Date |
|---|---|---|
| 1,126,326 | Whittelsey | Jan. 26, 1915 |
| 1,248,027 | Smeltzer | Nov. 27, 1917 |
| 1,310,395 | Gros | July 15, 1919 |
| 1,835,112 | Hawkins | Dec. 8, 1931 |
| 2,024,148 | Dahl | Dec. 17, 1935 |
| 2,032,721 | Schaefer | Mar. 3, 1936 |
| 2,159,203 | Chayne | May 23, 1939 |
| 2,352,301 | Welles | June 27, 1944 |
| 2,403,833 | Spangler | July 9, 1946 |

FOREIGN PATENTS

| Number | Country | Date |
|---|---|---|
| 5,983 | Great Britain | Sept. 13, 1906 |
| 304,886 | Great Britain | Jan. 31, 1929 |